United States Patent [19]

Lim

[11] Patent Number: 4,605,307

[45] Date of Patent: Aug. 12, 1986

[54] APPARATUS FOR LASER GYRO

[75] Inventor: Wah L. Lim, Anaheim, Calif.

[73] Assignee: Honeywell Inc., Minneapolis, Minn.

[21] Appl. No.: 390,417

[22] Filed: Jun. 21, 1982

[51] Int. Cl.[4] ............................................. G01C 19/64
[52] U.S. Cl. ................................................... 356/350
[58] Field of Search ........................... 356/350; 372/94

[56] References Cited

U.S. PATENT DOCUMENTS

| | | | |
|---|---|---|---|
| 3,373,650 | 3/1968 | Killpatrick | 356/350 |
| 3,467,472 | 9/1969 | Killpatrick | 356/350 |
| 3,937,578 | 2/1976 | Andringa | 356/350 |
| 4,152,071 | 5/1979 | Podgorski | 356/350 |
| 4,248,534 | 2/1981 | Elbert | 356/350 |
| 4,422,762 | 12/1983 | Hutchings et al. | 356/350 |
| 4,445,779 | 5/1984 | Johnson | 356/350 |
| 4,504,146 | 3/1985 | Morgan | 356/350 |

FOREIGN PATENT DOCUMENTS 2044984  10/1980  United Kingdom ............... 356/350

Primary Examiner—Vincent P. McGraw
Assistant Examiner—S. A. Turner
Attorney, Agent, or Firm—Robert A. Pajak

[57] ABSTRACT

The present invention discloses an apparatus for laser gyros capable of determining occurring incremental lock-in error by characterizing behavior of the sensor system before and after passing through the lock-in region an occurrence of lock-in error.

24 Claims, 16 Drawing Figures

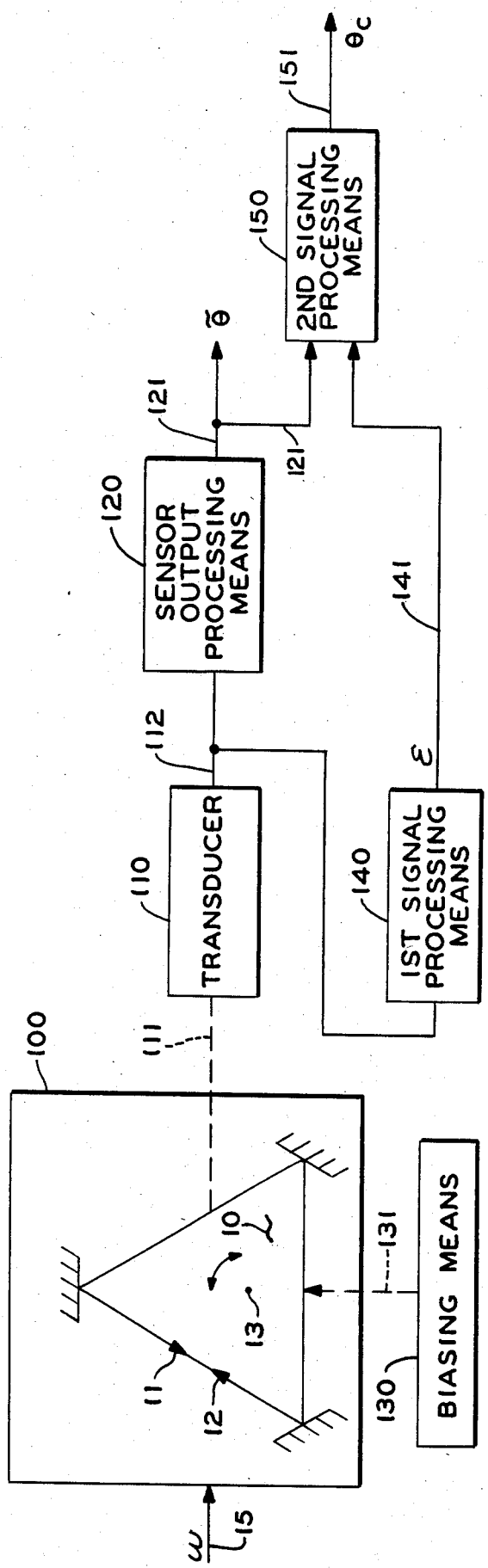
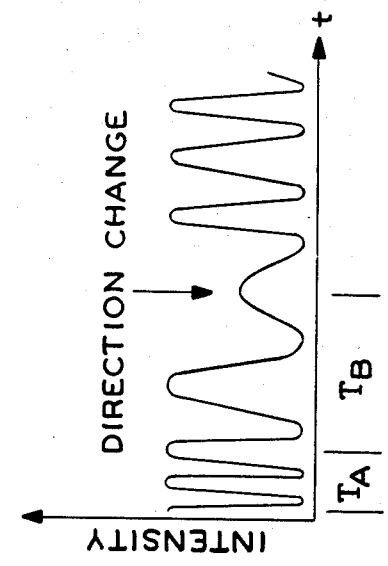
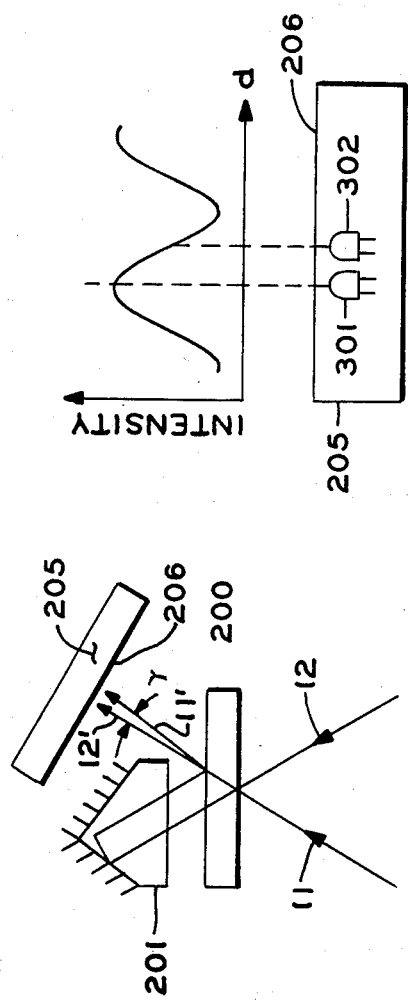
FIG. 1
FIG. 3b
FIG. 3a
FIG. 2

APPARATUS FOR LASER GYRO

BACKGROUND OF THE INVENTION

The present invention relates to the class of angular rate sensors wherein two waves propagate or travel in opposite directions in a closed-loop path and which may include a biasing system for frequency separating the propagating waves to minimize the effects of lock-in caused by energy coupling between the waves. In particular, the present invention provides an apparatus for providing a signal indicative of incremental lock-in error and a correction scheme whereby the sensor output can be corrected or compensated for accumulated error.

In a simple laser angular rate sensor, sometimes referred to as a ring laser gyro, two counter-traveling waves are provided by two waves or beams of substantially monochromatic electromagnetic radiation, usually two monochromatic beams of light usually in the form of laser beams. Two light beams are generated so as to travel in opposite directions along an optical closed-loop path which typically, though not necessarily, encloses the input axis about which rotation is to be sensed. When the sensor is at rest, the optical closed-loop usually referred to as the lasing path is identical for the oppositely traveling beams resulting in the frequency of oscillation of each beam being identical. Rotation of the ring laser gyro, particularly rotation of the closed-loop path, about the input axis causes the effective lasing path length traveled by one beam to increase, while the effective lasing path length traveled by the other beam to decrease. The resulting change in the effective lasing path length of the two beams produces a frequency change in each of the beams, one increasing and the other decreasing, since the frequency of oscillation of the beam of electromagnetic radiation in such systems is dependent upon the effective length of the lasing path. The frequency difference between the two beams is therefore indicative of rotation rate of the closed-loop path. The frequency difference between the two beam results in a phase difference between the counter-traveling beams which changes at a rate proportional to the frequency difference. Thus, the accumulated phase difference between the two beams is proportional to the time integral of the rotation of the closed-loop path. The total phase difference over a time interval is, therefore, indicative of the total angular displacement of the closed-loop path during the integrated time interval, and the rate of change of phase difference thereof is indicative of the rate of rotation of the closed-loop path.

A bothersome characteristic of the ring laser gyro is "lock-in". At rotation rates of the closed-loop path below some critical value called the lock-in threshold or lock-in rate, the frequency of the oppositely traveling beams synchronize to a common value resulting in the frequency difference being zero indicating no rotation at all. The lock-in characteristic arises due to mutual coupling of energy between the oppositely traveling waves. The dominant source of the coupling is mutual scattering of energy from each of the beams into the direction of the other. The effect is similar to lock-in coupling effects which have been long understood in conventional electronic oscillators.

In order to operate the gyro and provide useful rotation information, laser gyros known in the art have been provided a varying bias so as to maintain rotation of the gyro at rates above the lock-in level. A major advancement in this area was disclosed in U.S. Pat. No. 3,373,650, wherein a biasing system was provided which introduced a varying bias in the frequency of at least one of the counter-traveling beams of electromagnetic energy causing a varying frequency between the oppositely traveling beams, the bias being such that the varying frequency difference alternates in sign. The frequency bias so provided is such that their exists a frequency difference between the two oppositely traveling beams which is greater than the frequency difference which occurs near the lock-in rate for a majority of the time. Sign or polarity of the frequency difference is alternated, typically periodically, so that the time integrated frequency difference between the two beams integrated over the time interval between sign reversals reversing from the same sign direction is substantially zero. Note that at those instances of time that the sign or direction of the frequency difference reverses, the two beams will tend to lock-in since at some point the frequency difference therebetween is zero. Since the gyro output angle is generally derived from the frequency difference, an error accumulates in the gyro output angle. The periods of time that the two beams are locked-in usually are very short time intervals, and any possibly resulting gyro output angle error resulting therefrom is greatly reduced. Nevertheless, the incremental lock-in error resulting from these periods of time during lock-in corresponding to each sign reversal of the frequency difference accumulates in the gyro output angle signal, and in time can amount to a bothersome level, particularly in navigational systems. The accumulation of incremental lock-in error sometimes referred to as a random walk or random drift.

The bias provided in such biasing systems as disclosed in U.S. Pat. No. 3,373,650, is sometimes referred to as dither, and a ring laser gyro having such dither is referred to as a dithered gyro which is well known in the art. Hereafter, a dithered gyro is one in which a frequency bias is introduced into at least one of the counter-traveling beams whereby the frequency difference between the beams varies with time and alternates in sign. The alternation in sign may not be periodic in nature, i.e. not perfectly repetitious. The bias introduced may be provided by inertial rotation of the gyro (mechanical dithering) or may be provided by directly affecting the counter-traveling beams (electrical or optical dithering).

Many improvements have been made to the basic dither gyro disclosed in U.S. Pat. No. 3,373,650. One such improvement is disclosed in U.S. Pat. No. 3,467,472 wherein the improvement consists of randomly changing the amount of bias introduced into the counter-traveling beams in order to reduce the random walk resulting from the lock-in phenomenon. Accordingly, hereafter, a dither gyro is one with simple dithering or that which has dithering plus random biasing.

SUMMARY OF THE INVENTION

The present invention discloses an apparatus for determining an occurring incremental lock-in error of a laser angular rate sensor by characterizing the behavior of the sensor system before and after an occurrence of lock-in error. The incremental lock-in error may then be algebraically combined with the sensor output signal, derived from the frequency difference between counter-propagating waves therein, so as to provide correction of the sensor output signal for incremental lock-in error.

DESCRIPTION OF THE DRAWINGS

FIG. 1 is a block diagram illustrating the present invention.

FIG. 2 is a diagrammatic representation of a typical output scheme used in a ring laser gyro.

FIGS. 3a–b show further details of the output scheme of FIG. 2.

DESCRIPTION OF THE INVENTION

Figure 4A:
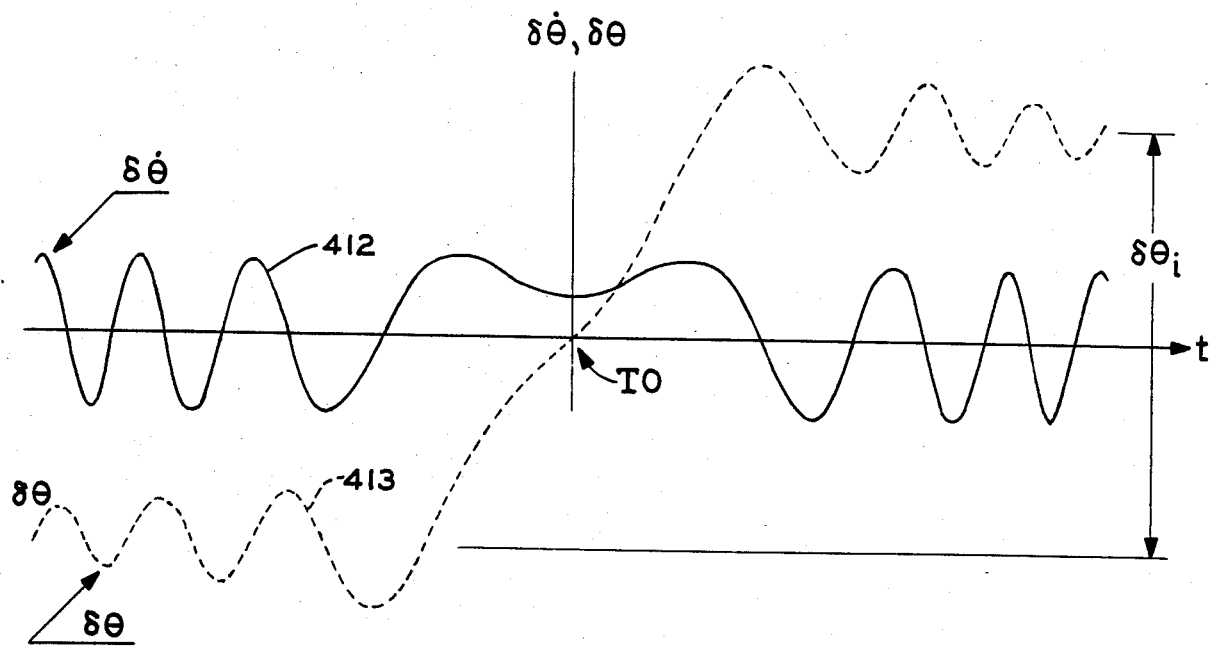
FIG. 4a is a graphical representation of lock-in error in a typical ring laser gyro output signal.

A general block diagram of the present invention is shown in FIG. 1. Block 100 represents a ring laser gyro. Illustrated within Block 100 is a triangular optical closed-loop path. Base 10 provides a means for supporting an assembly of mirrors which form an optical closed-loop path. Beams of substantially monochromatic electromagnetic radiation traveling in opposite directions about the closed-loop path are indicated by arrows 11 and 12. Rotation is sensed about the input axis 13. Line 15 represents inertial space base motion which is to be sensed by ring laser gyro 100. Inertial space base motion is to be distinguished from any other motion which ring laser gyro 100 may be subjected to, for example, mechanical dithering, herein referred to as dither motion. The ring laser gyro configuration illustrated by block 100 in FIG. 1 is similar to that described in U.S. Pat. No. 3,373,650. Other ring laser gyro configurations different than that described by U.S. Pat. No. 3,373,650 can be used and are within the scope of the invention of the present application. Although FIG. 1 and U.S. Pat. No. 3,373,650 shows a triangular closed-loop path, the invention of the present application is not restricted to such a configuration, and may be applied to rectangular closed-loop paths as well, and other such closed-loop configurations.

Transducer 110 is shown coupled to ring laser gyro 100 through coupling means 111. Transducer 110 provides an electrical signal or signals which represent the characteristic behavior of one or both of the counter-traveling beams. The electrical signals provided by transducer 110 provide sufficient information about the counter-traveling beams in order to ascertain the rotation about axis 13 of ring laser gyro 100. For example, transducer 110 can provide electrical signals indicative of the instantaneous phase difference between the two counter-traveling beams from which rotation information can be derived—the rate of change of the instantaneous phase difference is related to the frequency difference between the waves as is well known. A more detailed description of transducer 110 is provided below with reference to FIG. 2.

Electrical signals provided by transducer 110 are coupled to sensor output means 120 and first signal processing means 140 through transducer output connecting means 112. Means 120 and 140 can be combined in a single signal processing unit but are shown separated in FIG. 1 for exposition purposes.

Sensor output signal processing means 120 is responsive to selected ones of the electrical signals provided by transducer 110 on connecting means 112. Sensor output means 120 processes the information provided by transducer 110 and provides an output signal representative of the rotation about the laser gyro input axis 13. The information so provided by transducer 110 is the response of the counter-traveling beams caused by any rotation, i.e. inertial space base motion 15 and/or dithering, or any disturbance affecting the counter-traveling beams including optical biasing such as provided by a dithered Faraday cell. Sensor output means 120 output signal includes a lock-in error caused by the lock-in phenomenon inherent in sensors of the class described. Sensor output means 120 is well known in the art and will not be described in detail herein.

As indicated earlier, disclosed in U.S. Pat. No. 3,373,650 is a ring laser gyro in which the frequencies of the two counter-traveling beams of light are provided with a periodically reversing or altering bias so that a time varying frequency difference exists therebetween for a majority of the time so that the time integrated frequency difference between the two beams of light is substantially zero after one complete cycle of the periodically alternating bias. Shown in FIG. 1 is a biasing means indicated by block 130 coupled to ring laser gyro 100 through coupling means 131 for introducing a time varying bias in the frequency of at least one of the counter-traveling beams thereby causing a time varying frequency difference between the two counter-traveling beams which alternates in sign. The bias provided by biasing means 130 need not be periodic, that is, perfectly repetitious, but rather provide a bias which causes the frequency difference between the counter-traveling beams to change sign in regular, though not necessarily periodic, intervals. For purposes of ease of exposition, and as a matter of practicality, biasing means 130 will hereafter be considered periodic in nature.

As disclosed in U.S. Pat. No. 3,373,650, the periodically alternating bias may be achieved mechanically by providing a real rotational motion of the gyro about the input axis, or may be achieved by directly effecting a frequency change in the two counter-traveling beams by, for example, directly affecting the lasing path or lasing medium, these methods being referred to in U.S. Pat. No. 3,373,650 as electrically or optically biasing. Optical biasing may be provided by inserting a Faraday cell or birefringence element in the path of the waves as is well known. Thus, the biasing means shown by block 130 may be of the mechanical or electrical variety providing the periodically alternating bias.

First signal processing means 140 is shown responsive to selected ones of the electrical signals provided by transducer 110 on output connecting means 112. Signal processing means 120 and 140, respectively, may respond to the same signals or different signals provided by transducing means 110. First signal processing means 140 responds to signals presented on connecting means 112 from transducer 110 and determines lock-in error values indicative of the lock-in error included in sensor output means 120 output signal indicated by $\bar{\theta}$.

Signals representative of the lock-in error values provided by first signal processing means 140 and the output signal provided by sensor output means 120 are presented to a second signal processing means 150 through connecting means 141 and 121 respectively. Signals on connecting means 121 from sensor output means 120 represent the gyro output including lock-in and other errors. Second signal processing means 150 combines the uncorrected gyro output data presented on connecting means 121, and the lock-in error value signals presented on connecting means 141 from first signal processing means 140 for providing an output signal indicative of the rotation of ring laser gyro 100 corrected for lock-in error. The corrected gyro output signal is provided by second signal processing means 150 at output terminating means 151. Second signal processing means 150, of course, can be combined with one or both signal processing means 120 and 140, but have been distinguished from each other for exposition purposes.

The laser gyro assembly indicated by block 100 in FIG. 1 generally consists of a lasing medium providing two substantially monochromatic beams or waves of electromagnetic energy in the form of beams of light, a plurality of reflectors or mirrors defining a closed-loop path and an enclosed area, the two beams of light being directed to travel along the closed-loop path in opposite directions. One example of an output scheme for monitoring the behavior of the counter-traveling beams in order to determine the frequency difference therebetween, which is indicative of the rotation of the closed-loop path, is the optical system substantially shown in FIG. 2. One of the mirrors forming the closed-loop path in ring laser gyro 100 is slightly transparent and is indicated in FIG. 2 by mirror 200. The system shown in FIG. 2 is described in more detail in U.S. Pat. No. 3,373,650 and will be briefly described here.

Referring to FIG. 2, a portion of the energy in beam 12 passes through mirror 200 and travels through combiner right angle prism 201 and reflects off of the backside of the mirror 200 at the exit point where a portion of the energy of beam 11 passes through mirror 200. A portion of energy from beam 11 exiting from mirror 200 is indicated by beam 11', and the portion of energy of beam 12 reflecting off the backside of mirror 200 is indicated by beam 12'. The optical geometry of mirror 200 and right angle prism 201 is such that beams 11' and 12' are at a slight angle with each other. In these circumstances, an interference pattern is created on the surface 206 of detector 205. As is well known, the intensity of light on surface 206 is indicative of the instantaneous phase difference between the two counter-traveling beams 11 and 12. When laser gyro 100 is not rotating, the intensity at any point on the surface 206 remains constant. In the presence of rotation about the lock-in rate, the intensity changes with time between maximums and minimums at a rate proportional to the rotation rate sensed by laser gyro 100. In this manner, optical information is presented on the surface 206 of detector 205 for transduction into different signals such as electrical signals. The functions of mirror 200 and right angle prism 201 essentially makes up one example of coupling means 111; detector 205 and the surface thereof, 206, essentially make up one example of transducer 110. One example of a detector using such a coupling means as just described will now be presented.

Transducer 110 may be provided by one or more photodetectors positioned at the surface 206 of detector 205 shown in FIG. 2 and is more fully illustrated in FIG. 3a. Shown in FIG. 3a is detector 205 consisting of photodetectors 301 and 302. Indicated directly above photodetectors 301 and 302 is a graphical representation of a typical interference pattern that can be created on surface 206 by energy beams 11' and 12'. The graphical illustration is a plot of intensity of the combined beams versus distance along the surface 206 that may be observed by photodetectors 301 and 302. Although a single photodetector can be used to obtain rate of rotation information, a second photodetector is usually required to determine rotation direction. The combined beam intensity measured at the surface at a particular point on the surface of 206 gives a relative indication of the instantaneous phase difference between the two counter-traveling beams 11 and 12. This "relative phase difference" is clearly exemplified by noting the difference in intensity measured by photodetector 301 compared with the intensity measured by photodetector 302, two different points on the surface 206. The intensities measured by photodetectors 301 and 302 are, of course, relative since they depend upon their position relative to the surface 206.

In the presence of rotation, the interference pattern moves with time as indicated in FIG. 3b. FIG. 3b is a graphical representation of the intensity measured, for example, by only photodetector 301 versus time. Note that the relatively fast rate of change of intensity indicated in the time interval TA is faster than the rate indicated during a time interval TB. The faster rate of change of intensity during time interval TA indicates a greater rotation rate than during time interval TB. In operation, the photodetector in transducer 110 will provide electrical signals directly related to the intensity of the interference pattern created on the surface 206. These signals are usually amplified and processed to determine the rotation rate about the axis 13 of ring laser gyro 100 as well as the angular displacement during selected time intervals for determining navigational position. As is indicated in FIG. 1, sensor output means 120 provides the function of processing the electrical signals provided by transducer 110, and has as an output the gyro output angle, $\bar{\theta}$. Since the output signal of sensor output means 120 is derived from the frequency or phase behavior of the counter-traveling waves, the output signal thereof will include lock-in error.

One example of sensor output means 120 for determining such information is a signal processing system which counts the interference pattern intensity maximums or minimums or portions thereof from at least one photodetector. The information is further processed as to rate of change of such maximums or minimums as well as whether they are in a positive or negative direction based on information from a second photodetector such as photodetector 302. In a dithered gyro, sensor output means 120 generally will have the capability of filtering out the bias introduced into the frequency difference of the two counter-traveling beams which is introduced by biasing means 130. Examples of sensor output 120 means are disclosed in U.S. Pat. No. 3,373,650 and U.S. Pat. No. 3,627,425. The output of sensor output means 120 is a signal representative of at least the angular displacement about the gyro input axis 13 derived from signals representative of the behavior of the two counter-traveling beams therein. Hereafter, the output signal provided by sensor output means 120, representative of gyro angular displacement or gyro output angle, is referred to as the gyro output signal or simply "gyro output" and includes lock-in error.

In one embodiment of the invention, electrical signals, such as those presented to the sensor output means 120 from, for example, photodetectors 301 and/or 302, are utilized to obtain lock-in error information in order to process the gyro output signal provided by sensor output means 120 and produce navigational information corrected for lock-in error.

To facilitate understanding of the invention, an explanation of the nature and behavior of a dithered ring laser gyro is necessary. Ring laser gyros are sometimes referred to as integrating rate gyros. That is, the rotation rate is integrated for determining positional information with regard to the angular rotation about the input axis. This may be expressed by the following equation:

$$\dot{\theta} = S\dot{\psi} = S[f_2 - f_1] \quad (1)$$

where:

$f_2$, $f_1$ are the individual frequencies of the two counter-traveling beams;

S is a scale factor;

$\dot{\psi}$ is the rate of change in phase between the two counter-traveling beams; and $\theta$ is the gyro output angle, and $\dot{\theta}$ is the gyro output rate.

If the phenomenon of lock-in or other disturbances did not exist, then:

$$\dot{\theta} = \omega_{in} \quad (2)$$

$\omega_{in}$ is the true or actual inertial rotation rate of the closed-loop path regardless of the source.

However, because of lock-in, the gyro output rate contains an error due to energy coupling between waves wherefrom lock-in arises. One mathematical expression which substantially describes the effects of lock-in upon the gyro output rate is represented by the following equation (Aronowitz, Laser Applications, Vol. 1, 1971):

$$\dot{\theta} = \omega_{in} - \Omega_L \sin(\psi + \beta) \quad (3)$$

where:

$\psi$ is the instantaneous phase angle between the two counter-traveling beams;

$\Omega_L$ is the lock-in rate;

$\beta$ is a phase angle measurement offset of the instantaneous phase angle $\psi$, and is presumed constant;

In equation (3), $\dot{\theta}$ is related to $\dot{\psi}$, the rate of change in $\psi$, by the sensor scale factor K:

$$\dot{\psi} = K\dot{\theta} \quad (4)$$

Further, the value of $\beta$ is dependent upon the placement of a defined reference photodetector for determining the instantaneous phase angle, $\psi$. This is so since the reference photodetector can be placed anywhere with respect to the interferring waves or interference pattern normally used to obtain information. Once a detector optical system is established, $\beta$ is presumed constant.

The following analysis is directed to the quantification of the incremental lock-in error generated in a dithered ring laser gyro system so as to arrive at a means for determining lock-in error values associated with the gyro output angle. And so, the lock-in error term in equation 3 is rewritten for exposition purposes in equation (5).

$$\delta\dot{\theta} = -\Omega_L \sin(\psi + \beta) \quad (5)$$

The transcendental expression for the gyro output angle rate error shown in equation (5) is a function of the instantaneous phase angle between the two counter-traveling beams, a function of the sensor lock-in rate, and the phase angle measurement offset. In order to attempt a solution to equation (5) yielding an actual quantity of lock-in error rate, a time varying expression for the value of $\psi$ is first obtained.

Consider a biasing system similar to those disclosed in U.S. Pat. Nos. 3,373,650 and 3,467,472. In a mechanical biasing system, base 10 of ring laser gyro 100 is mechanically rotated in a back and forth motion in a periodic manner resulting in the frequency difference between the two counter-traveling beams to vary in a sinusoidal manner, periodically alternating in sign. In these circumstances, the instantaneous phase angle between the two counter-traveling beams continually increases in magnitude with time as base 10 is rotated in one direction. At the instance that the direction of rotation changes from one direction to the opposite direction, the time varying frequency difference tends toward zero.

FIG. 4a graphically illustrates the error resulting from the relation described in equation (5) for a dithered gyro in the region of rotation direction reversal corresponding to a zero rate condition of $\dot{\psi}$. Curve 412 plots the error in the gyro rate output $\delta\dot{\theta}$ against time, showing a decreasing frequency before the reversal occurring at time T0, and an increasing frequency thereafter. The essentially constant amplitude of curve 412 is dependent on the sensor's characteristic lock-in rate, $\Omega_L$. Curve 413 plots the error in the gyro angular output, $\delta\theta$, which is obtained by integrating curve 412. As shown, the gyro angular error is oscillating with varying frequency and amplitude before and after the change of direction, and exhibits a step through an incremental error angle $\delta\theta_i$ across the change of direction. This incremental error angle is herein referred to as the incremental lock-in error value. As may be seen from FIG. 4a, the error resulting from equation (5) is always present, but has its most important effect when a change of direction occurs. For a periodic sinusoidal dithered ring laser gyro, such a change of direction occurs twice each dither cycle, and such an error as described on curve 413 occurs at each change of direction. Unfortunately, these lock-in error values resulting from the alternating bias are not necessarily equal in magnitude nor always opposite in sign. This leads to a build-up of error in the gyro output sometimes referred to as random drift or random walk.

The discussion presented just above was described for a mechanically dithered gyro. Nevertheless, the characteristics of a sensor optically or electrically dithered are similar to those already presented, and therefore will not be discussed in the following discussion. Further, the analysis just presented is also applicable to other forms of dithering (say, triangular) besides sinusoidal dither.

Figure 4B:
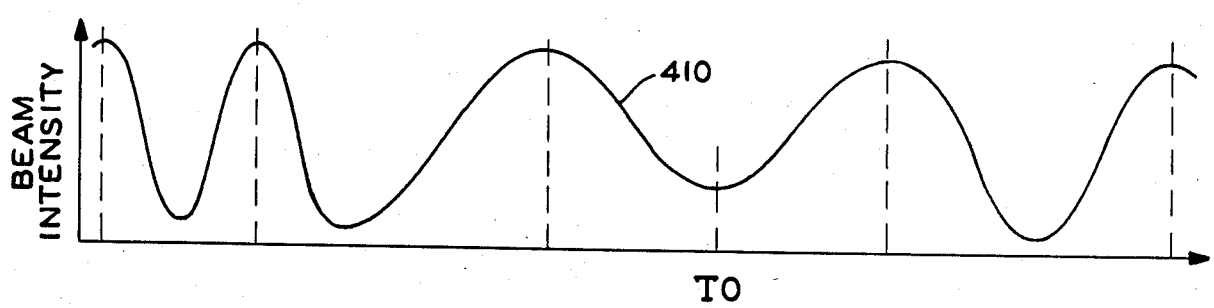
FIG. 4b is a graphical representation of the combined beam intensity presented to a detector about a region of direction reversal of a dithered gyro.
Figure 4C:
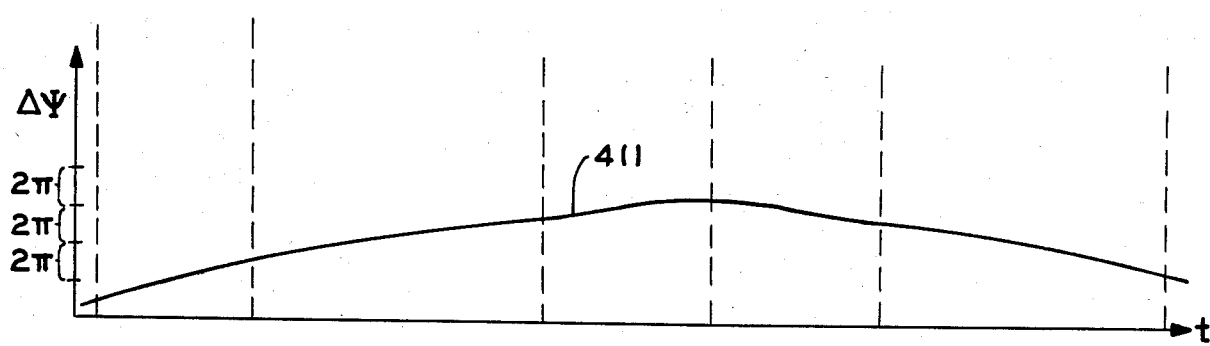
FIG. 4c is a graphical representation of the total phase shift change about a region of direction reversal of a dithered gyro.

Curve 410 in FIG. 4b graphically illustrates the intensity of the combined beams 11' and 12' producing the interference pattern observed by, for example, photodetector 301 shown in FIG. 3a as well as the output electrical signal thereof about the instant of time T0 illustrated in FIG. 4a. Curve 410 essentially indicates the instantaneous phase angle $\psi$ plus the measurement offset phase angle $\beta$. From curve 410, the change in instantaneous phase angle between the two counter-traveling beams can be obtained since the instantaneous phase angle thereof changes $2\pi$ radians between two successive intensity maximums or two successive intensity minimums as observed by photodetector 301. A plot of the total $\Delta\psi$, the change in gyro output angle in the region about T0 is graphically illustrated in FIG. 4c, curve 411. Note that the rate of change of the instantaneous phase angle between the two counter-traveling beams gradually decreases until time T0, at which time the frequency difference reverses polarity indicating that $\dot\psi$ has traveled through zero. At times greater than T0 the rate of change in $\psi$ increases until an instant of time is reached which corresponds to the maximum negative frequency difference. Monitoring the rate of change of the instantaneous phase angle can provide a means for detecting the occurrence of a change in polarity of $\dot\psi$, or in other words, a "zero rate crossing".

Figure 5A:
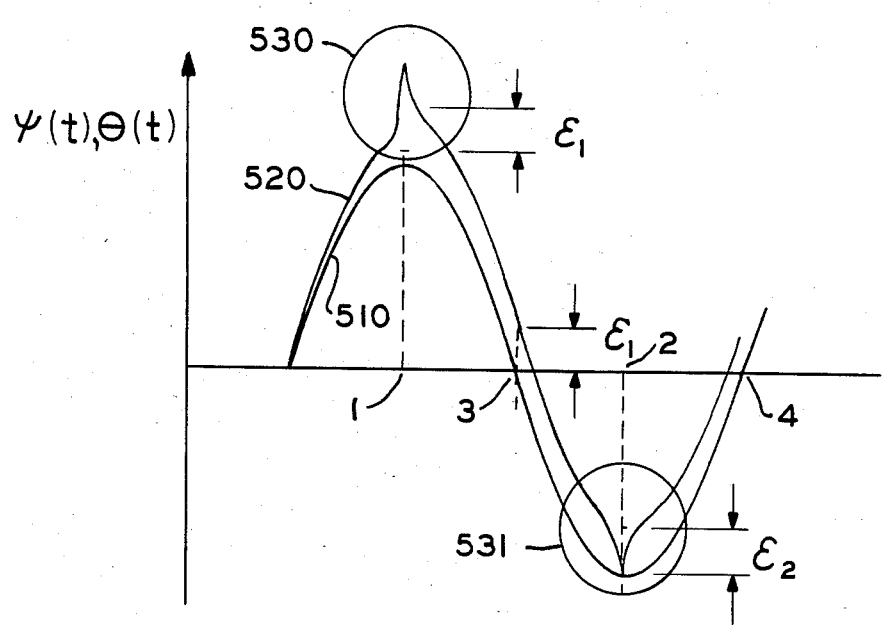
FIGS. 5a and b graphically represent an occurring incremental lock-in error contributing to random drift.

As indicated above, the incremental lock-in error value occurs substantially about the point of direction reversal, $\dot\psi$ being zero, which will hereafter be called the zero rate crossing (ZRC). This is not to be confused with the change in polarity of a dithering bias. In the presence of inertial space motion, the zero rate crossing ($\dot\psi=0$) does not occur at the same time that the bias changes polarity, although it is very close. The effects of the incremental lock-in error value upon the gyro output signal are graphically illustrated in FIG. 5a. In FIG. 5a, curve 510 is a graphical representation of the actual rotation of the gyro, $\theta$, versus time. Curve 510 represents chosen sinusoidal dithering motion of the gyro 100 provided by biasing means 130. (In the following discussion, it is assumed that there is no other inertial space base motion which is normally to be sensed by the ring laser gyro 100.) Also in FIG. 5a is curve 520 which is a graphical representation of the output phase angle, $\psi$, versus time corresponding to the input motion represented by curve 510. Two successive zero rate crossings are indicated by the timing points 1 and 2. Because of the lock-in error which occurs about the zero rate crossing as indicated in FIG. 4a, a step or perturbation in the value of $\psi$ is shown occurring at timing points 1 and 2 in the plot of $\psi$ versus time. The magnitude of these steps or perturbations in $\psi$ correspond to incremental lock-in error values obtained in the gyro output provided by sensor output means 120.

The incremental lock-in error value occurring about the zero rate crossing at point 1 is indicated as an offset $\epsilon_1$, thereat and at timing point 3. At point 3, $\theta$ is again zero, but $\psi$ is not. The offset shows up as an angular rotation error in the gyro output after one-half of a dither cycle. If there was no lock-in error, there would be no offset and no angular rotation error. The error at point 3 is commensurate with the step change at the zero rate crossing at point 1. Further, at the next ZRC crossing at point 2, another error $\epsilon_2$ exists. Accordingly, the error $\epsilon_2$ at the next zero angle $\theta$, designated timing point 4, is the sum of the two incremental lock-in error values occurring at the previous two ZRCs, namely, timing points 1 and 2.

The invention of the present application is a novel method and corresponding apparatus for obtaining the incremental lock-in error value which usually accumulates in the usual sensor output after each passing through a zero rate crossing. The lock-in error value determined by the present invention can then be subtracted from the usual sensor output after each occurrence of a zero rate crossing, or can be filtered to derive a sum of lock-in error values to be subtracted from the sensor output.

In the invention of the present application, incremental lock-in error values are obtained by:

(i) characterizing the behavioral function of $\psi$ by a first characteristic function $\psi_b(t)$ determined by $\psi(t)$ data "before" an occurrence of a zero rate crossing so that the value of $\psi_b(t)$ at the zero rate crossing can be extrapolated therefrom;

(ii) characterizing the behavioral function of $\psi$ by a second characteristic function $\psi_a(t)$ determined by $\psi(t)$ data "after" the last zero rate crossing so that the value of $\psi_a(t)$ at the last zero rate crossing can be extrapolated therefrom;

(iii) determining an incremental lock-in error value which is the difference value between the values of $\psi(t)$ at the same zero rate crossing determined by the first and second characteristic functions, $\psi_a(t)$ and $\psi_b(t)$.

The difference value as aforesaid of each zero rate crossing corresponds to the contribution of lock-in error which is contained in the usual sensor output derived from phase angle information. The sensor output can then be simply algebraically corrected by the difference value calculated at the zero rate crossing determined by the first and second characteristic functions.

Figure 5B:
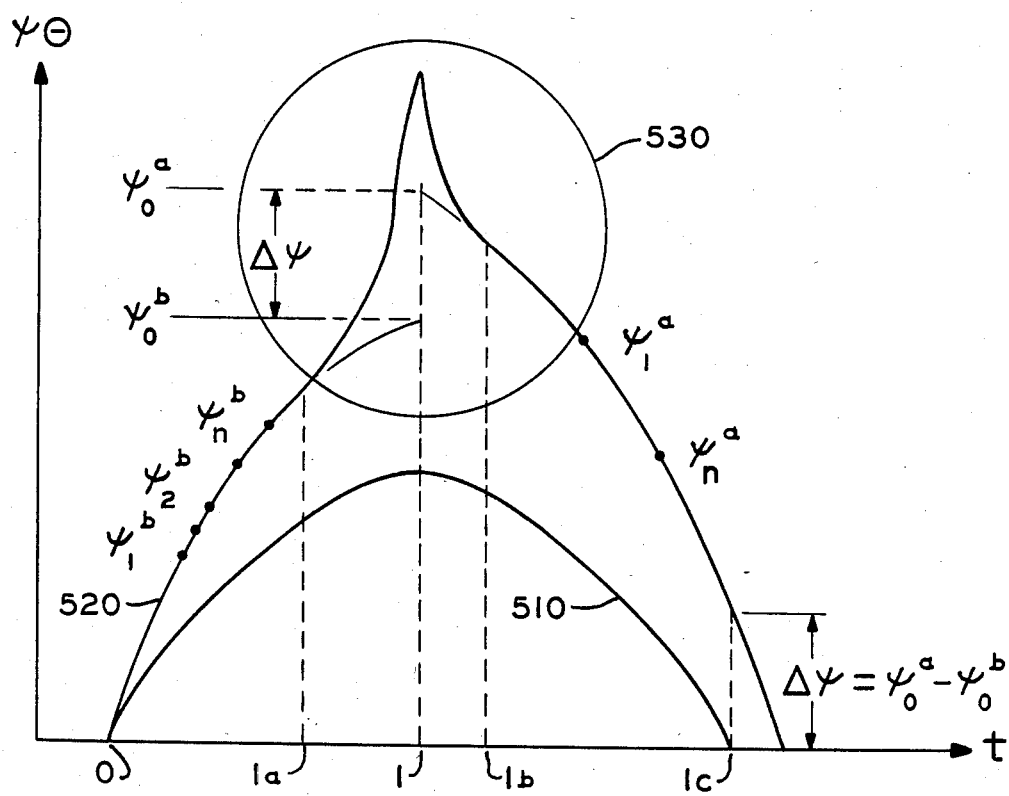

The principles of the invention are illustrated in FIGS. 5a and 5b. As before, Curve 510 represents chosen sinusoidal dithering input motion to the sensor, curve 520 represents the phase angle output normally processed by sensor output means 120 in FIG. 1, and zero rate crossings are indicated by numerals 1 and 2 on the time axis. If there were no lock-in error, curve 520 would have exactly the same shape, namely sinusoidal, as curve 510. However, because of lock-in error, a perturbation exists about the zero rate crossing as indicated in the area circumscribed by circles 530 and 531. Such perturbations occurring at each subsequent zero rate crossings not shown.

FIG. 5b is a diagrammatic amplification of curve 510 and the corresponding output phase information indicated by curve 520 for the first half cycle of curve 510 shown in FIG. 5a. Associated with each half cycle of curve 510 is a polarity of the second derivative of motion as well as the second derivative of the phase difference. In the time interval between zero and 1a, curve 520 corresponds directly with curve 510, namely $\psi$ can be characterized by a sinusoid in the time interval between 0 and 1a. Assuming no lock-in error, the value of $\psi$ at the zero rate crossing indicated by time point 1 can be extrapolated to be $\psi_o{}^b$ derived from an assumed sinusoidal characteristic function since it would track curve 510. (The subscript "o" indicating a zero rate crossing value, at $\dot\psi=0$, and the superscript "b" indicating the evaluation of $\psi_o$ based on the characteristic "before" the crossing as opposed to superscript "a" indicating evaluation based on the characteristic "after" the crossing.) After the zero rate crossing in the time interval between time points 1b and 1c, curve 520 could be similarly characterized by a sinusoid. However, because of the perturbation which exists about the zero rate crossing, the sinusoidal characteristic after the zero rate crossing is offset as compared to that before the zero rate crossing. That is, the sinusoidal characteristic between 0 and 1a is not continuous with the sinusoidal characteristic between 1b and 1c. Nevertheless, by obtaining phase information between the time interval 1b and 1c and using the sinusoid as an assumed characteristic function, the value of the zero rate crossing at point 1 based on information of $\psi$ after the zero rate crossing can be extrapolated graphically as is indicated by $\psi_o{}^a$. The difference between $\psi_o{}^b$ and $\psi_o{}^a$ substantially represents the incremental lock-in error value as a result of the occurring zero rate condition existing at point 1. This lock-in error value is indicated as an offset where the net rotation input angle is zero at point 1c, and the offset phase value is equal to the phase difference between $\psi_o{}^b$ and $\psi_o{}^a$.

It should be noted that FIG. 5b is an exaggeration, both in form and magnitude, to illustrate the principles of the invention. The normal difference value found between the values $\psi_o{}^a$ and $\psi_o{}^b$ is typically less than $2\pi$ radians.

Separate characteristic functions of $\psi(t)$ before and after the zero rate crossing may be generated by obtaining a plurality of data points of phase and time information in the region about the zero rate crossing before and after the zero rate crossing. In FIG. 5b, data points before a zero rate crossing are indicated as $\psi_n{}^b$, and data points after a zero rate crossing are indicated as $\psi_n{}^a$. Separate characteristic functions before and after the zero rate crossing of $\psi(t)$ can be determined by a variety of curve fitting techniques using $\psi_n{}^b$ and $\psi_n{}^a$ data respectively. One curve fitting technique which may be used is the least squares curve fitting technique. Another curve fitting techniques may be to assume a given function and determine a set of coefficients based on the data points. After the separate characteristic functions before and after a zero rate crossing have been determined, the value at the zero rate crossing can be extrapolated. The difference between the zero rate crossing values, $\psi_o{}^a$ and $\psi_o{}^b$, based on the separate characteristic functions before and after the ZRC is the occurring incremental lock-in error value.

In the following discussion, the technique for finding the ZRC values based on assumed behavioral function characteristics will be illustrated. The first assumption in the discussion which follows is that $\ddot{\psi}(t)$ in the region of the ZRC is essentially constant. Based on the first assumption the following quadratic expression for $\psi(t)$ may be obtained:

$$\psi = \psi_o + \frac{\ddot{\psi}_o(t - t_o)^2}{2} \qquad (6)$$

where
t is time
$t_o$ is the time at the ZRC
$\psi_o$ is the instantaneous phase angle as indicated by one of the photodetectors at the ZRC
$\ddot{\psi}_o$ is the second derivative of $\psi$ at the ZRC It is important to note that the zero rate crossing is responsive to, and dependent upon the total rotational motion about the gyro input axis, and includes both inertial space rotation and dither motion. Although the discussion so far presented and the discussion which follows utilizes a mechanical dither, an electrical biasing means, as indicated above, has also a corresponding ZRC phase angle.

Signal processor 140 includes a first approximating means for determining a first characteristic function $\psi_o(t)$ based on phase angle data "before" an occurrence of a ZRC, and a second approximating means for determining a second characteristic function $\psi_a(t)$ based on phase angle data "after" the same occurrence of a ZRC. Signal processor 140 further includes a means for determining a first extrapolated ZRC phase angle using the first characteristic function, and second extrapolated ZRC phase angle, for the same ZRC, using the second characteristic function. Signal processor 140 further determines the difference between the first and second zero rate crossing phase angles for the same ZRC occurrence and is indicative of the incremental lock-in error produced about the ZRC.

Figure 6:
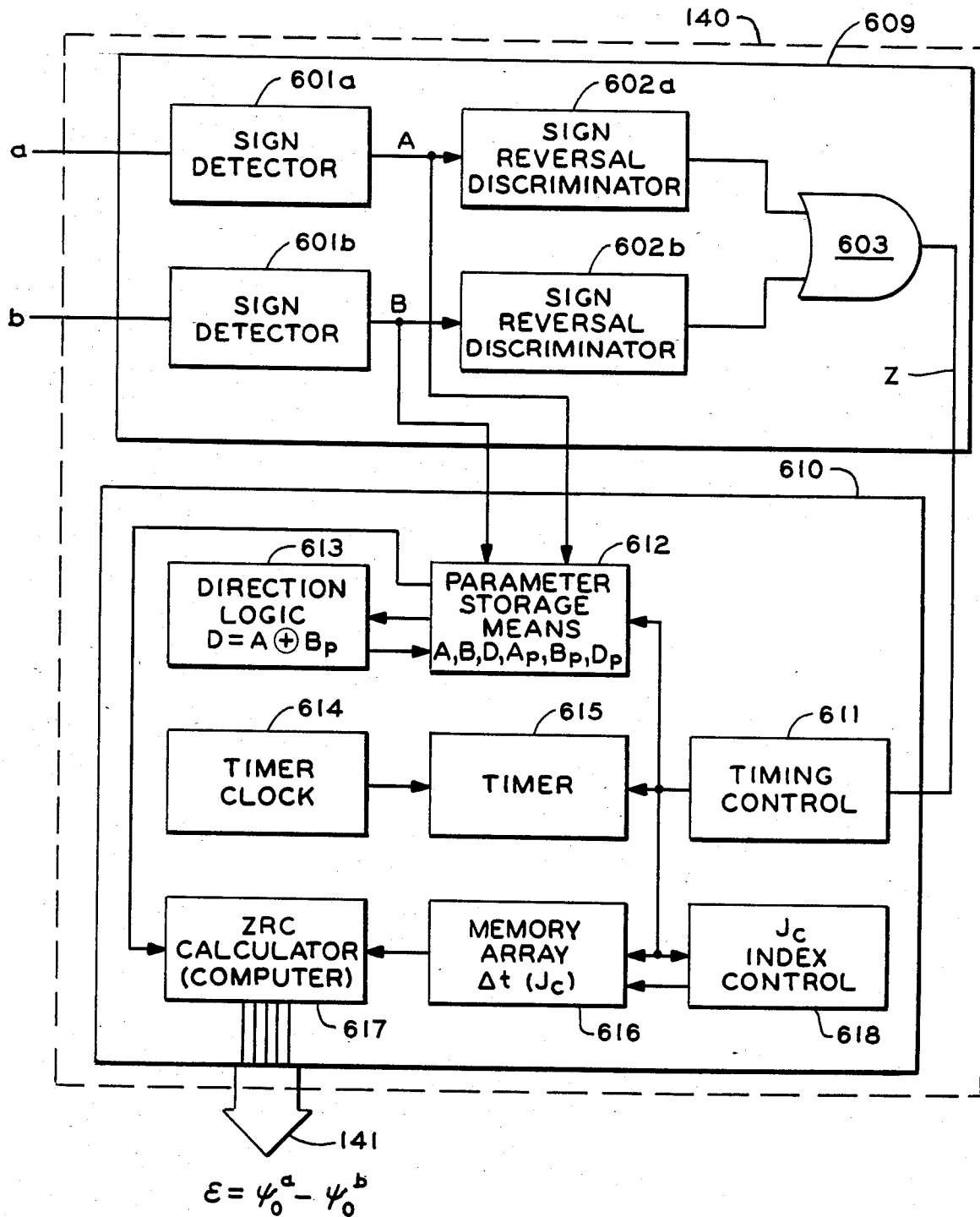
FIG. 6 is a block diagram of a signal processing system of the present invention.

FIG. 6 is a block diagram of an example for first signal processing means 140 of FIG. 1. Referring to FIG. 1 and FIG. 6, first signal processing means 140 receives signals from transducer 110 through connecting means 112. Electrical signals on connecting means 112, as indicated earlier, are representative of the instantaneous phase difference between the two counter-traveling beams. By way of example, the electrical signals may be the output of two photodetectors 301 and 302 as shown in FIG. 3a. These signals are presented to signal processing means 140 which includes a digital signal processor 610 and timing generator circuitry 609 with output Z. First signal processing means 140 is capable of (i) generating $\psi(t)$ data; (ii) extrapolating a value of the first and second ZRC values based on the characteristic functions of $\psi(t)$ before and after the ZRC instance, and (iii) obtaining the difference between the ZRC phase angle values which is representative of the lock-in error value. The flow diagrams of FIGS. 7a–c will be used to describe the signal flow of signal processor 610 in combination with the output of the timing generator circuitry 609.

Instantaneous phase angle information $\psi(t)$ may be provided by the output of detectors 301 and 302, shown in FIG. 3a, being represented by signals "a" and "b". These signals are graphically illustrated in FIG. 8 by curves 801 and 802. The ZRC phase angle and direction can be obtained from information supplied by either of or both photodetectors 301 and 302. With photodetectors 301 and 302 separated by one-quarter of a fringe spacing of the interference pattern generated on surface 206, the output signals of photodetectors 301 and 302 will be in phase quadrature. Arbitrarily designating the output of photodetector 301 as "a" and the output of photodetector 302 as "b", an expression for their outputs can be represented by:

$$a = \sin(\psi) \qquad (7)$$

$$b = \cos(\omega + \phi) \qquad (8)$$

where $\psi$ is the instantaneous phase angle between the counter-traveling beams offset by $\beta$ defined above, and $\phi$ is attributed to the alignment spacing error of physically separating the photodetectors 301 and 302 by exactly one-quarter of a fringe spacing orthogonality. In the detection system exemplified by equations (7) and (8), the zero reference occurs when signal "a" is zero and signal "b" is positive.

One approach to obtain $\psi$ at the ZRC instant based on phase information before the ZRC, the point at which $\psi$ equals zero, is to measure the times between "sign" changes of the "a" and "b" signals and employ the approximation that $\ddot{\psi}$ is nearly constant in the region of ZRC. By knowing the elapsed time between when, for example, "a" is zero and going positive, and when "b" becomes zero, for each of several sign changes of "a" and "b", a determination of the value of ZRC phase angle, $\psi_o$, at the ZRC instant can be made.

Figure 8:
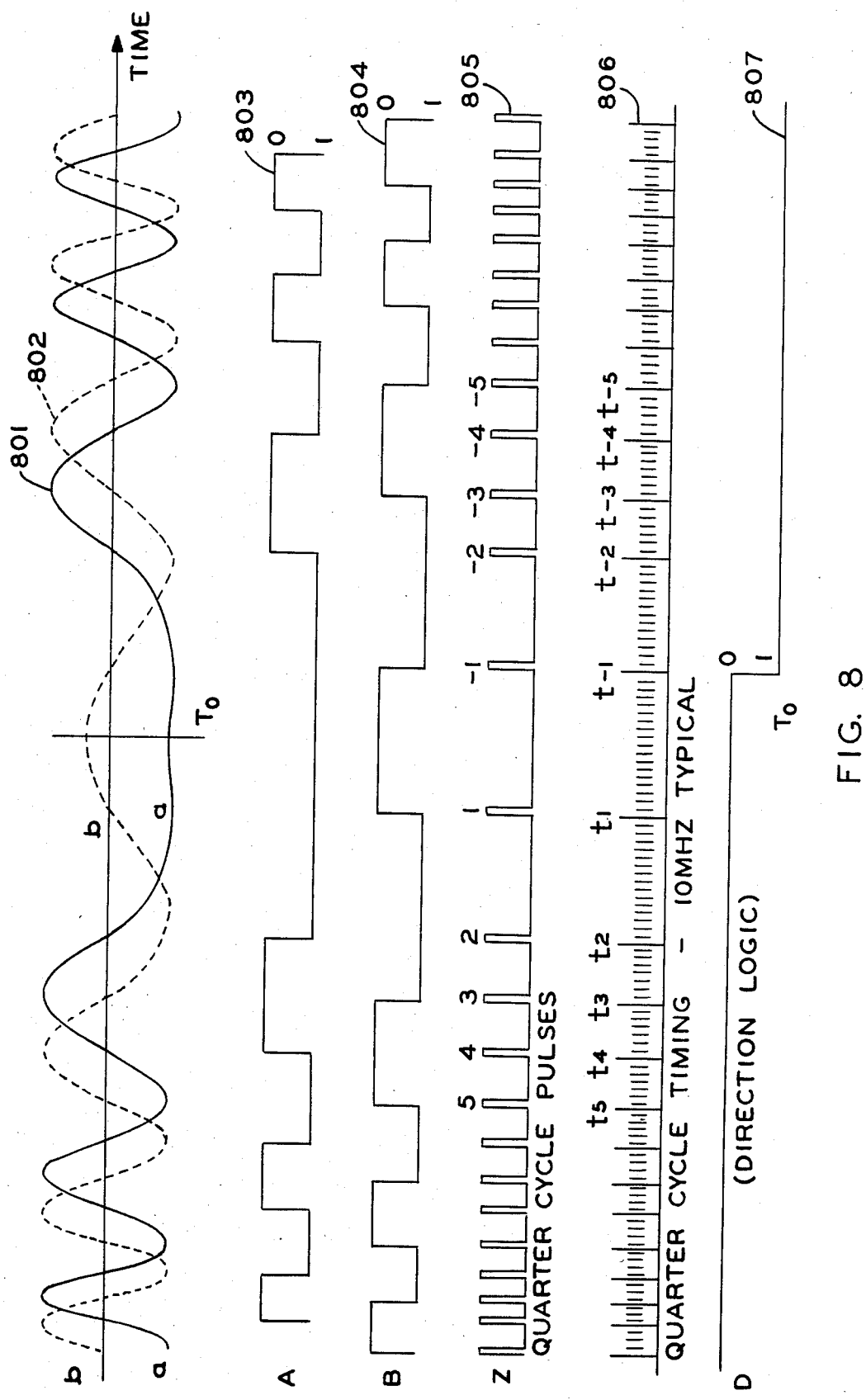
FIG. 8 is a timing diagram illustrating the signals of the system shown in FIG. 6.

Referring now to FIGS. 6 and 8, the output of photodetectors 301 and 302 represented by "a" and "b" are passed through sign detectors 601a and 601b respectively. The output of the sign detectors is a digital representation of the polarity of the input signals "a" and "b", where a high voltage level represents a logical zero corresponding to a positive polarity of the input signal, and a low voltage level represents a logical one corresponding to a negative polarity of the input signal. The output of sign detectors 601a and 601b are A and B respectively, becoming the digital representation of the polarity of input signals "a" and "b" respectively. The output of sign detectors 601a and 601b are individually passed through sign reversal discriminator blocks 602a and 602b respectively, each having as outputs a pulse, of small width, each time the input signals A and B respectively change polarity. The output of sign reversal discriminator 602a and the output of sign reversal discriminator 602b are inputs to an OR circuit 603, the output of which is designated Z. In the presence of rotation about the gyro input axis, the output of OR circuit 603 is a series of pulses representing all changes in polarity of input signals "a" and "b". This is so since the interference pattern is moving at a rate proportional to rotation and the phase ($\psi$) is changing by $2\pi$ radians for every complete fringe spacing change. The output signal Z becomes a quarter cycle timing generator as will be further explained.

Sign detectors 601a and 601b, and sign reversal discriminators 602a and 602b can be constructed in a variety of ways made up of simple signal comparators, pulse edge discriminators, pulse shapers, and the like, and therefore are not described herein.

Shown in FIG. 8 is a graphical representation of input signals "a" and "b" indicated by curves 801 and 802 respectively. The output of sign detectors 601a and 601b are shown as signals A and B respectively by curves 803 and 804 respectively prior to, and just after, a sign reversal of $\dot{\psi}$ or ZRC at time T0. Curve 805, shown in FIG. 8, is a graphical representation of the quarter cycle output pulses, Z, of OR-gate 603 providing pulses at each occurrence of a change in state in either of signals A or B corresponding to a change in polarity of input signals "a" and "b" respectively. The numbers just above curve 805 are reference numerals for designating quarter cycle time events of signals "a" and "b". Also indicated in FIG. 8 is the instant of time T0 where a $\dot{\psi}$ sign reversal occurs, which is the ZRC instant of time. This will be explained in detail below.

For purposes of discussion, time to the left of T0 in FIG. 8 corresponds to the situation where $\dot{\psi}$ is positive and $\ddot{\psi}$ is negative. As indicated earlier with reference to FIGS. 3a and 3b, a full cycle of either signal "a" or "b" corresponds to a phase change of $2\pi$ radians between the two counter-traveling beams, a half-cycle corresponding to a phase angle change of $\pi$ radians. Assuming, for this discussion, that the value of $\phi$, the orthogonality constant, is zero, the time elapsed between the event of A changing logic state and then B changing logic state, or vice versa corresponds to a phase angle change between the counter-traveling beams of $\pi/2$ radians. Defining the time period elapsed between known changes in state of A and B corresponding to a phase angle change of $\pi/2$ radians as phase angle quadrants, the quarter cycle pulses, Z, can be utilized to approximate the characteristic function of $\psi(t)$ for determining the ZRC phase angle at time T0.

The ZRC phase angle may be represented by a number, of $\pi/2$ quadrants plus an angle $\alpha$, where $\alpha$ is defined to be the amount of phase change in the last quadrant entered before the sign of $\dot{\psi}$ changes. In the example indicated in FIG. 8 on curves 801 and 802, the last quadqant occurs after point "1" where signal "b", curve 802, has a zero value and is rising.

Assuming, as indicated earlier, that $\ddot{\psi}$ about the ZRC crossing is substantially constant, and utilizing the characteristic function for $\psi$ expressed in equation (6), the unknown value of $\ddot{\psi}$ and the value of $\psi_o$ can be determined in terms of elapsed time between changes of state between signals A and B. These unknown values are essentially unknown coefficients of a predetermined characteristic function of $\psi(t)$. The following discussion considers the procedure for determining the unknown coefficients of a chosen characteristic function $\psi(t)$, namely that of equation (6), including the ZRC value $\psi_o^b$ based on data before an occurring ZRC. The same characteristic function can be utilized to determine $\psi_o^a$, but will require re-evaluation of the coefficients.

The following exposition describes one way of using the quarter cycle pulses and the known phase change therebetween to determine the ZRC phase angle. Defining j, by timing reference points as indicated above curve 805, and $t_j$ as the time of the change of state of either A or B as indicated above curve 806, the following mathematical expression derived from equation (6) relates the elapsed times between A and B, the angle $\alpha$, and $\ddot{\psi}$:

$$\alpha + (j-1)\frac{\pi}{2} = \frac{|\ddot{\psi}_o|}{2}(\Delta_j)^2 \text{ for } j = 1, 2, 3, \ldots \quad (9)$$

where: $\Delta_j = t_o - t_j$, and $$t_o = \frac{t_1 + t_{-1}}{2}$$

This employs the approximation that $t_o$ is at the midpoint between the change of state of either A or B immediately before the ZRC and the corresponding change of state immediately after the same ZRC. Equation (9) can be solved in terms of quarter cycle times called $\Delta t_j$, which are based on counting a high frequency clock between quarter cycle pulses as shown on curve 806. These are defined as $$\Delta t_j = t_{j-1} - t_j, \text{ and } \Delta t_1 = \tfrac{1}{2}(t_{-1} - t_1)$$

$$\text{for which } \Delta_j = \sum_{i=1}^{j} \Delta t_i$$

satisfying the requirement of equation (9). By knowing a sequence of $\Delta_j$'s, simultaneous equations determined from equation (9) can be used to solve for $\ddot{\psi}_o$ and $\alpha$. By knowing the polarity of $\dot{\psi}$ and the polarity of signals "a" and "b" derived from the logical signals A and B, and using the trigonometric cosine and sine relationships, the ZRC phase angle value for $\psi(t)$ can be determined. Note that the last data point at $t_{-1}$ is only used to find $T_o$ and is not used for determining the unknown values of $\alpha$ and $\ddot{\psi}_o$.

Equation (10) below is a modification of equation (9) which includes the orthogonality constant, $\phi$. Three simultaneous equations can be produced from known time values between the "a" and "b" zero crossing points to solve for $\alpha$, $\ddot{\psi}_o$ and $\phi$. From the logical signals A and B derived from signals "a" and "b" the polarity of $\dot{\psi}$ can be determined and the ZRC quadrant can be identified. This information can be used to calculate $\ddot{\psi}_o$ in terms of $\alpha$.

The polarity of $\dot{\psi}$ can be defined by the logical expression $$D = A \oplus Bp \begin{cases} 0 \text{ positive} \\ 1 \text{ negative} \end{cases}$$

where Bp is the logical state of B before the most recent change of state of either A or B.

$$\alpha \pm \lambda_j \phi + (j - 1)\frac{\pi}{2} = \frac{|\ddot{\psi}|}{2} \Delta_j^2 \text{ for } j = 1, 2, 3, \ldots \quad (10)$$

The value of $\lambda_j$ in equation (10) times $\phi$ is zero whenever:

$A \oplus B \oplus D = 0$ and j is odd, or $A \oplus B \oplus D = 1$ and j is even.

Otherwise $\lambda_j$ is "1" having the sign value being positive when $\dot{\psi}$ is positive, and negative when $\dot{\psi}$ is negative.

The above discussion shows just one technique for obtaining the value of $\ddot{\psi}$ and $\ddot{\psi}_o$. Many other approaches are, of course, possible using the measurements of $\Delta t$ between phase changes occurring and indicated by the output of either of photodetectors 301 or 302. One example of another technique for obtaining the value of $\ddot{\psi}_o$ and $\ddot{\psi}_o$ is the use of half-cycle times. That is, making time measurements between successive positive going and negative going zero crossings of the output signal provided by one of the photodetectors which can, of course, be determined by looking at changes of state of either of the logical outputs A or B. An expression similar to equation (10) can be generated, a new set of simultaneous equations can be written. Similarly, $\ddot{\psi}$ and $\ddot{\psi}_o$ can be determined by making time measurements between whole cycle times.

Again referring to FIG. 6, the output signals A and B and Z are presented to signal processor 610. Signal processor 610 includes a timing control, 611, parameter storage means, 612, direction logic means, 613, timer clock 614, timer 615, memory array 616, index control 618, and ZRC calculator (computer) 617. Each of these elements are well known in the art, and can be found in any general purpose computer including the variety of computers known as microprocessors or microcomputers.

Parameter storage means, 612, stores the values of A and B, the prior values of A and B defined as Ap and Bp, before the last received quarter cycle pulse, Z, the logical representation of the polarity of $\dot{\psi}$ indicated by D, and the previous value of D, defined as Dp, before the last quarter cycle pulse. The values of D and Dp are provided by direction logic block 613 having the logical expression indicated above. The information stored in parameter storage means 612 and memory array 616 is utilized for ZRC phase angle determination in connection with ZRC calculator 617.

Signal processor 610 includes a timing control, 611, which is primarily controlled by the output of pulses from OR-gate 603, the quarter cycle timing. Timing control signal 611 essentially synchronizes the storage parameters A, B and D before and after the quarter cycle pulse. Timing control, 611 also synchronizes timer, 615, which times or counts timer clock pulses provided by timer clock, 614. Timer clock pulses are indicated by pulses 806 in FIG. 8. Timer 615 counts the number of clock pulses between quarter cycle pulses, Z, indicated by pulses 805 in FIG. 8. The purpose of timer clock 614 and timer 615 is to determine the real time between quarter cycle pulses. The output of timer 615 is a digital represenation of the real time between quarter cycle pulses and is successively stored after each quarter cycle pulse in memory array 616. Memory array, 616, stores the real time values between quarter cycle pulses and stores them in a matrix or array location identified by the index term "Jc" provided by index control 618 as is indicated in FIGS. 6 and 8. The memory array is under control of timing control 611 so that the index Jc is incremented for each quarter cycle pulse.

As indicated earlier, having the times between quarter cycle pulses, and detecting the occurrence of direction change, D, the value of the ZRC phase angle and the value of $\ddot{\psi}$ can be determined as already indicated.

Curve 806 in FIG. 8 represents the output of timer clock 614 for timer 615 having a value of 10 megahertz. It is assumed in the discussion which follows relative to the flow diagrams shown in FIG. 7 that the dither frequency is relatively slow compared with the ZRC calculator cycle times for computation. Of course, many variations of the value of timer clock 614 may be utilized with more or less greater accuracy for the ZRC phase angle determination.

Figure 7A:
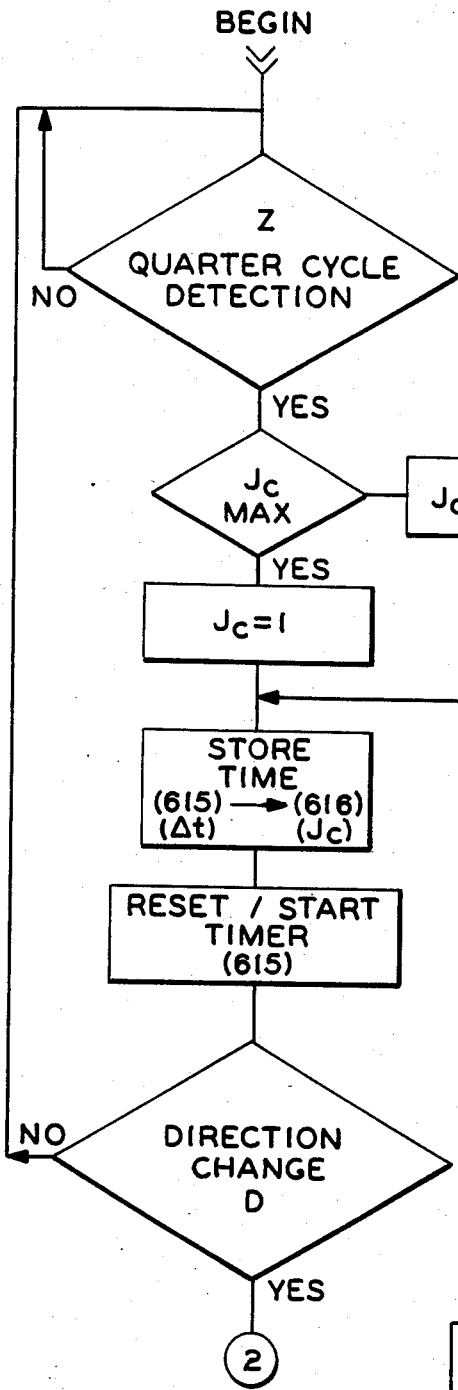
FIGS. 7a–c are flow diagrams of the signal processing system of FIG. 6.

ZRC calculator 617, in FIG. 6, is essentially a computer or microprocesser programmed for solving the simultaneous equations for determining a solution of equation (10) for $\alpha$, $\phi$, and $\ddot{\psi}_o$. The flow diagrams shown in FIG. 7a illustrate the primary functions of signal processor 610. The flow diagrams of FIG. 7a begin by noting a quarter cycle detection signal provided by the output Z. The index, Jc is incremented by one and the time between the last quarter cycle pulse and the current one is stored in the appropriate indexed array, and the timer is reset. At this point in the flow diagram the direction parameters D and Dp are examined to determine if a direction change has occurred, namely the ZRC crossing. If not, the cycle repeats. If a direction change is indicated, the ZRC calculation process begins as noted in the flow diagram shown in FIG. 7b.

Figure 7B:
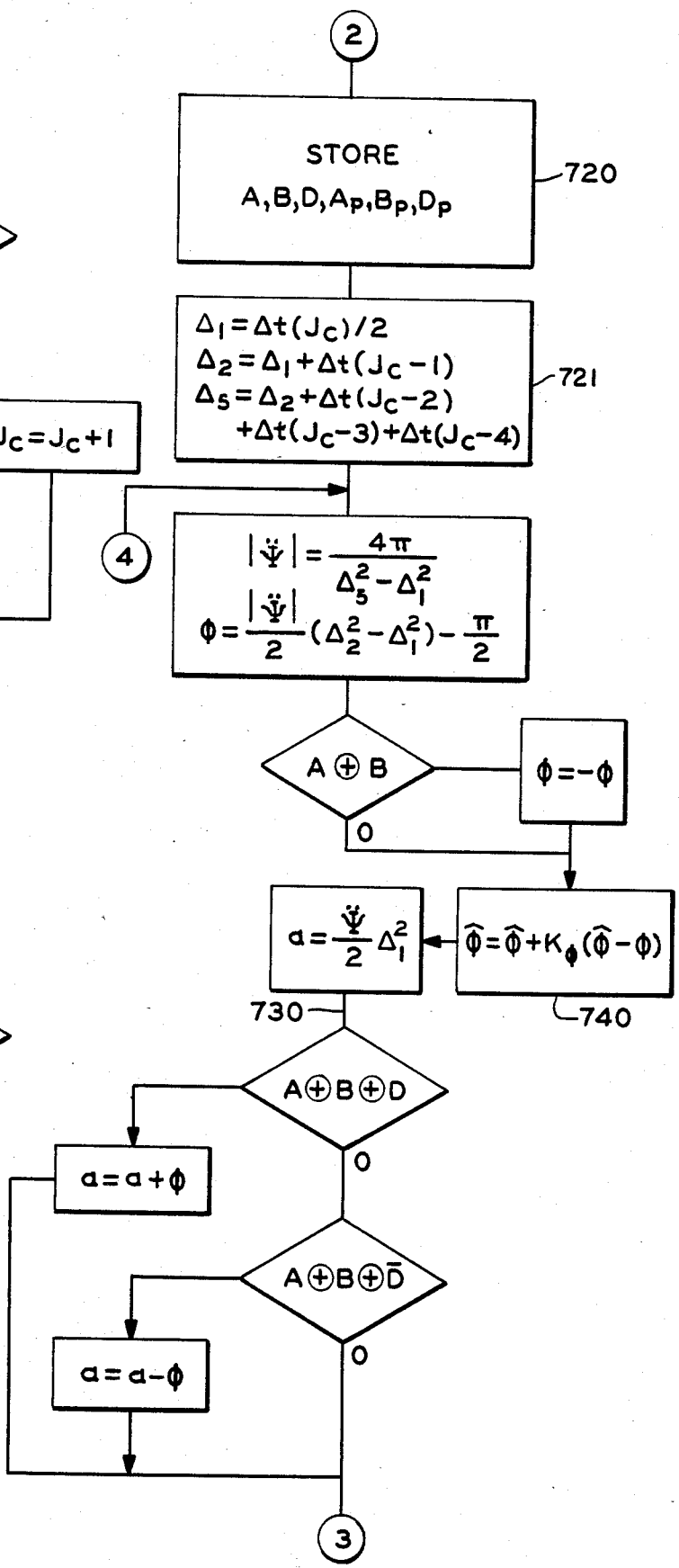

At the beginning of the ZRC phase angle calculation indicated by the routine shown in the flow diagram of FIG. 7b, the values of A, B, $A_p$, $B_p$, D and $D_p$ are stored as indicated by block 720. Note that when the ZRC routine is entered, the values of $A_p$, $B_p$, and $D_p$ are those values which correspond to the phase angle quadrant prior to the direction or polarity change of $\dot{\psi}$, and A, B, and D correspond to those values after the direction changed, that is after the zero rate crossing—$\dot{\psi}$ being zero.

The ZRC routine process continues in FIGS. 7a and 7b by calculating the individual values of $\Delta_j$ for J=1, 2 and 5, and are subsequently utilized for calculation of $\alpha$, $\phi$, and $\ddot{\psi}_o$. Note that other values could have been chosen except for J=1 for determining a different set of simultaneous equations. J=1 is needed for determining $T_o$, and calculation of $\alpha$. Using these values of $\Delta_j$, a set of simultaneous equations are generated for the solution of equation (10) as shown below:

$$\ddot{\psi} = \frac{4\pi}{\Delta_5{}^2 - \Delta_1{}^2}, \quad \alpha = \frac{|\ddot{\psi}|}{2}\Delta_1{}^2 \quad (11)$$

$$\phi = \frac{|\ddot{\psi}|}{2}(\Delta_2{}^2 - \Delta_1{}^2) - \frac{\pi}{2}$$

Using the stored parameters in block 720, the sign of $\phi$ is determined for modifying the value of the $\alpha$ angle calculated. Once $\alpha$ is determined at point 730 in the flow diagram, the value of $\alpha$ can be corrected for the orthogonality constant $\phi$. The $\alpha$ of the flow diagram at numeral 3 in FIG. 7b is the value of the fraction of a quarter cycle. The ZRC phase angle $\psi_o$ is an integral number of quarter cycles, $\pi/2$ phase angle angle radians plus the value of $\alpha$. The flow diagram shown in FIG. 7b is continued in FIG. 7c at the entry point indicated by numeral 3 in FIG. 7c.

Figure 7C:
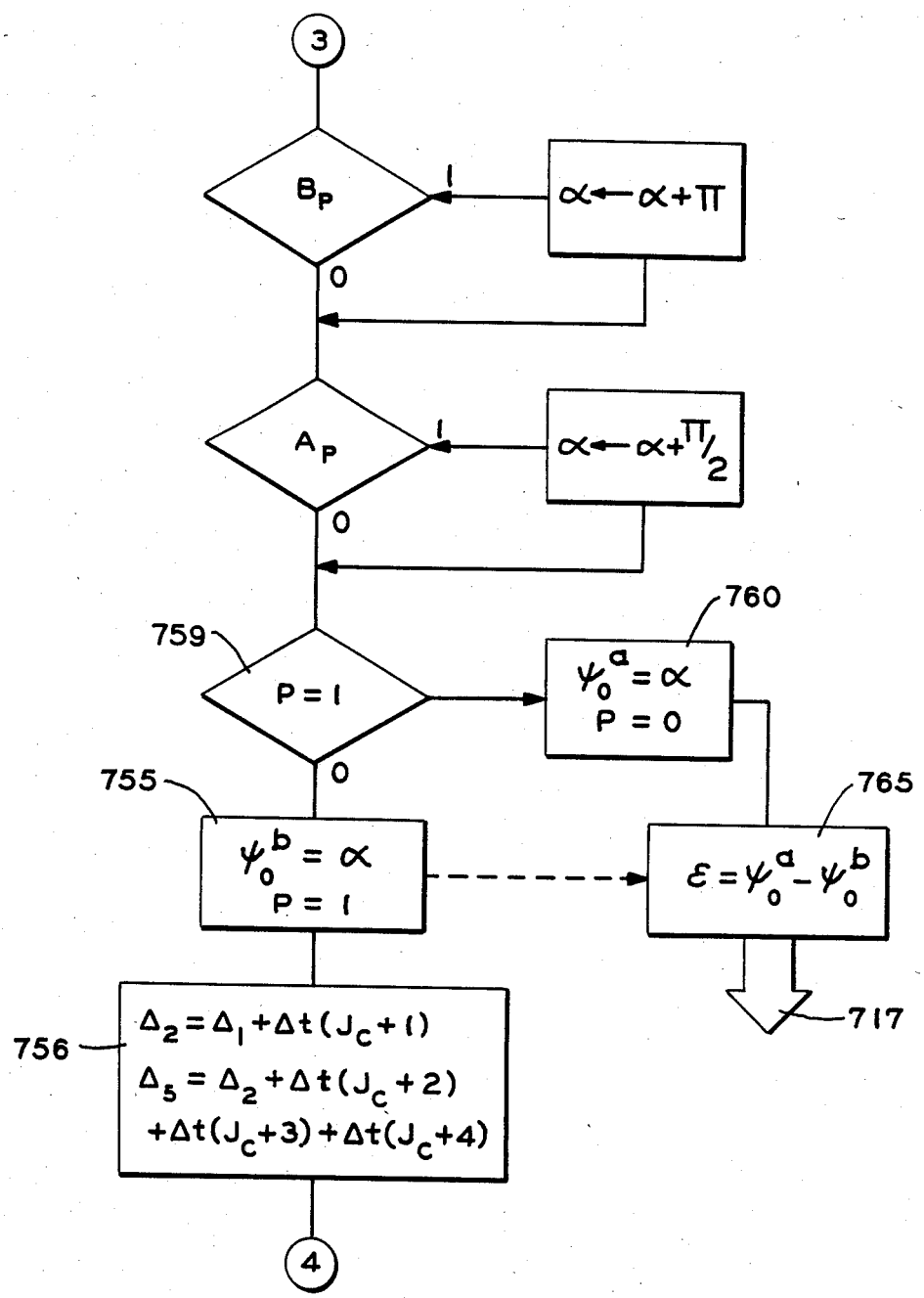

In FIG. 7c, the logical states of $A_p$ and $B_p$ are checked for adjusting the value of $\alpha$ by an integral number of quarter cycles. The value of $\psi_o{}^b$ is stored in block 755. Also in block 755 is an indication of an index, P set to "1". The flow diagram continues in block 756 by a change of values for the timing increments so that the "$\Delta_j$'s" are determined by phase angle information occurring "after" the ZRC crossing. Once the change in timing variables is made, the flow diagram exits from FIG. 7c at numeral 4 and re-enters FIG. 7b at numeral 4 for the calculation of the ZRC phase angle, $\psi_o{}^1$, based on phase information after the ZRC crossing. The ZRC phase angle is obtained in a similar manner as that already described and is stored in block 760 after existing from the P index check by block 759.

Block 765 calculates the difference in values between $\psi_o{}^b$, and $\psi_o{}^a$ which is the lock-in error value occurring at the last ZR crossing.

The flow diagram as just described is repeated for each ZRC calculation. When the calculation is completed, the output indicated by output line 717 in FIG. 7c, and 141 in FIGS. 1 and 6, provides a signal indicative of the lock-in error value resulting from the last ZRC and is available for subsequent signal processing by second signal processing means 150.

Signal processing means 150 of FIG. 1 performs a simple calculation of adding the algebraic value of the lock-in error value provided by signal processing means 140 with the output of sensor output means 120 to provide a corrected sensor output, $\theta_c$.

Figure 9A:
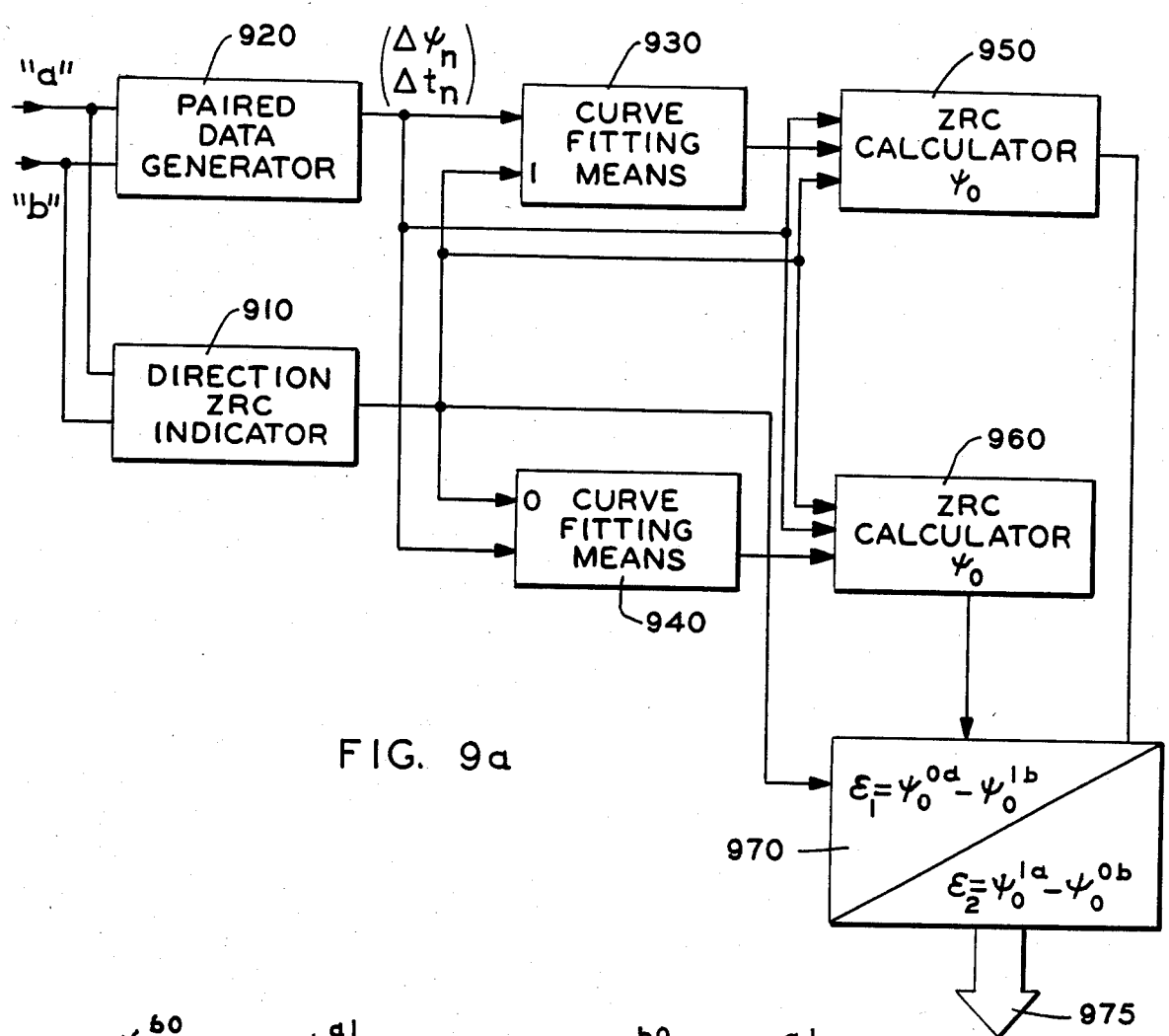
FIG. 9a is a block diagram of another implementation of a processing system of the present invention.

FIG. 9a shows another embodiment of the invention where a curve fitting technique is employed for obtaining the ZRC phase angle based on the characteristic behavior of $\psi(t)$ before the ZRC crossing, and determining the value of the ZRC phase angle based on the characteristic behavior of $\psi(t)$ after the ZRC crossing. Referring now to FIG. 9, the output of the photodetectors "a" and "b" are presented to ZRC indicator 910 and paired data generator 920. Indicator 910 provides an output signal indicative of the occurrence of $\psi=0$, and indicative of the polarity of $\psi$ before and after the occurrence of $\psi=0$. Block 910 can also be constructed in a manner as that described with reference to FIG. 6. Paired data generator 920 provides output signals representative of elapsed times between selected changes in phase angle, $\Delta\psi$—for example quarter cycle times described above. A processor similar to signal processing means 610, employing the principles of data extraction illustrated in FIG. 8, can be used for block 920.

The output of the paired data generator is presented to a first curve fitting means 930 and a second curve fitting means 940. Each of the curve fitting means is enabled by the output of the direction/ZRC indicator 910. Curve fitting means 930 is enabled when the output of block 910 is a "1", and the curve fitting means 940 is enabled when the output of block 910 is a "0". Curve fitting means 930 approximates the characteristic function $\psi(t)$ before the ZRC which is utilized by ZRC calculator 950 for extrapolating the value of the ZRC phase angle based on the characteristic function before the ZRC. Similarly, curve fitting means 940 approximates the characteristic function $\psi(t)$ after the same ZRC which is utilized by ZRC calculator 960 for extrapolating the value of the ZRC phase angle based on the characteristic function after the ZRC.

ZRC calculators 950 and 960 respond to the characteristic functions determined by curve fitting means 950 and 960 respectively. Each ZRC calculator responds to selected pair data information 920 and direction/ZRC indicator 910 for (i) responding to the occurrence of a ZRC and (ii) determining the elapsed time between the just occurring ZRC and a known data pair. Having (i) and (ii) just above, each ZRC calculator generates the appropriate ZRC phase angle by use of the appropriate characteristic functions.

Figure 9B:
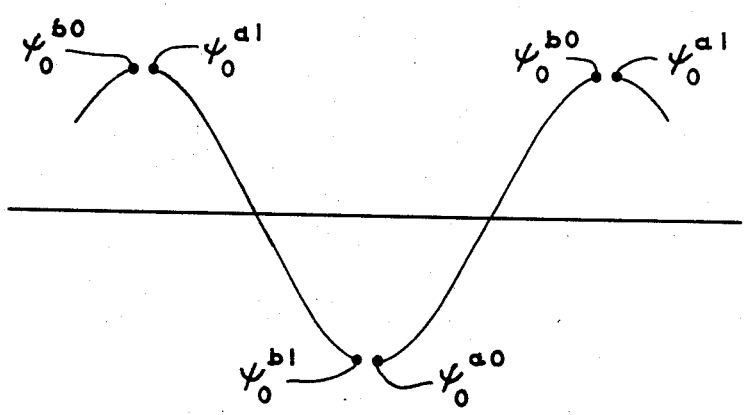
FIG. 9b is a graphical representation of illustrating the principles of the invention.

FIG. 9b is a graphical representation of the ZRC phase angles which are calculated by the ZRC calculators 950 and 960, as well as that provided by signal processor 610. Again, the superscripts, "a" and "b" signify "after" and "before" a ZRC phase angle. The superscript 1 indicates a first polarity and superscript 0 represents a second polarity of $\psi$ corresponding to the direction/ZRC indicator 910.

The output of the ZRC calculators 950 and 960 are connected to a difference calculator for calculating the appropriate lock-in error values dependent upon the direction change at the ZRC crossing. The output of block 970 provides signals representative of the lock-in error value similar to the output of block 765 in FIG. 7c. This information when combined in signal processing means 150 can be also utilized for directly correcting the output of sensor output means 120 for correcting the output phase angle information for lock-in error occurring about the ZRC crossing.

The operation of the embodiment of the invention shown in FIG. 9a will now be described. Data generator 920 continuously supplies paired data signals representative of elapsed time between selected phase changes of either one or both of signals "a" and "b". With the output of direction/ZRC indicator 910 being a "1", curve fitting means responds to the paired data generator for determining the characteristic function of $\psi(t)$ based on data after the last ZRC and next approaching ZRC. The ZRC calculator 950 responds to the paired data information from generator 920 and the characteristic curve supplied by means 930 for extrapolating the ZRC values of the last and the next occurring ZRC phase angles. This is illustrated in FIG. 9b as $\psi_o{}^b$ and $\psi_o{}^a$. Similarly, curve fitting means 940 responds to the output of paired data generator 920 for determining the characteristic function of $\psi(t)$ when the output of direction/ZRC indicator 910 is a "0". ZRC calculator 960 responds to the paired data generator 920 output and the characteristic function supplied by curve fitting means 940 to extrapolate the values of the last occurring and the next occurring ZRC phase angle. These values provided by ZRC calculators 950 and 960 are synchronously stored in block 970 for determination of the lock-in error values indicated by $\epsilon^1$ and $\epsilon^2$. Block 970 is synchronized by the output of direction/ZRC indicator 910 for appropriately calculating the ZRC angle differences for determination of the incremental lock-in error values indicated within block 970 as $\epsilon_1$ and $\epsilon_2$.

In the foregoing description of the embodiments of the invention shown in the accompanying drawings, the characteristic behavior of $\psi(t)$ is determined so that the value of the ZRC phase angle can be extrapolated based on data before and after the occurrence of the ZR phase angle. From this information, the lock-in error value can be determined by simple difference calculations. Obviously, many modifications and variations of the present invention are possible in light of the above teachings. Particularly, the methods used for curve fitting and/or assumed characteristic functions have a wide range of possibilities. Also, the method of determining the ZRC instant as well as the angle has wide variations in design and accuracy. The ZRC measurement has been shown utilizing a time measurement technique, but an analog technique of sample and hold could also be implemented. The accuracy of the system is, of course, dependent upon how accurately can a characteristic function be described and how accurately the value of the ZRC phase angle can be determined through extrapolation. Further, it should also be noted, a variety of biasing techniques, closed-loop path configurations, and electromagnetic waves are of course possible in practicing a laser angular rate sensor. It is, therefore, to be understood that within the scope of the depending claims the invention may be practiced otherwise as specifically described.

The embodiments of the invention in which an exclusive property or right is claimed are defined as follows:

1. An apparatus for determining incremental lock-in error in a sensor output of an angular rate sensor of the class wherein two waves propagate in opposite directions along a closed-loop path, wherein the frequency of each of said waves is a function of the rate of rotation of said closed-loop path, said waves establishing a phase difference therebetween, wherein said sensor provides an output signal, related to the frequency difference between said waves, indicative of the rotation of said closed-loop path, but which includes lock-in error, the apparatus comprising:

signal means responsive to said waves for providing at least one output signal related to said phase difference between said waves;

first signal processing means responsive to said at least one output signal for providing an output signal related to incremental lock-in error due to the lock-in phenomenon of said sensor, said first signal processing means having, first approximating means for determining a first characteristic function descriptive of said phase difference for a first selected time interval in which first derivative values of said phase difference are continuously of a first polarity, said first approximating means further being capable of extrapolating from said first characteristic function a first value of said phase difference corresponding to a selected occurrence of a zero value of said first derivative having a corresponding second derivative value of said phase difference of a first polarity, and second approximating means for determining a second characteristic function descriptive of said phase difference for a second selected time interval in which first derivative values of said phase difference are continuously of a second polarity, said second approximating means further being capable of extrapolating from said second characteristic function a second value of said phase difference corresponding to said selected occurrence; and difference means for determining a difference value between said first and second values, said incremental lock-in error being directly related to said difference value.

2. An apparatus for correcting lock-in error in a sensor output of an angular rate sensor of the class wherein two waves propagate in opposite directions along a closed-loop path, wherein the frequency of each of said waves is a function of the rate of rotation of said closed-loop path, said waves establishing a phase difference therebetween, wherein said sensor provides an output signal, related to the frequency difference between said waves, indicative of the rotation of said closed-loop path, but which includes lock-in error, the apparatus comprising:

signal means responsive to said waves for providing at least one output signal related to said phase difference between said waves;

first signal processing means responsive to said at least one output signal for providing an output signal related to incremental lock-in error due to the lock-in phenomenon of said sensor, said first signal processing means having, first approximating means for determining a first characteristic function descriptive of said phase difference for a first selected time interval in which first derivative values of said phase difference are continuously of a first polarity, said first approximating means further being capable of extrapolating from said first characteristic function a first value of said phase difference corresponding to a selected occurrence of a zero value of said first derivative having a corresponding second derivative value of said phase difference of a first polarity, and second approximating means for determining a second characteristic function descriptive of said phase difference for a second selected time interval in which first derivative values of said phase difference are continuously of a second polarity, said second approximating means further being capable of extrapolating from said second characteristic function a second value of said phase difference corresponding to said selected occurrence; and difference means for determining a difference value between said first and second values, said incremental lock-in error being directly related to said difference value;

second signal processing means adapted to respond to said sensor output signal and said difference value for correcting said sensor output signal value for said incremental lock-in error.

3. The apparatus of claim 1 or 2 wherein said first signal processing means includes:

means responsive to said signal means output signal for generating time data consisting of elapsed times between selected changes in said phase difference;

means responsive to said signal means output signal for determining an occurrence of said selected occurrence of a zero value of said first derivative;

means adapted to respond to selected ones of said time data for determining a first elapsed time between said selected occurrence and a known one of said time data occurring before said selected occurrence, and for determining a second elapsed time between said selected occurrence and a known data time occurring after said selected occurrence;

said first approximating means having, means adapted to respond to selected ones of said time data occurring before said selected occurrence for determining a set of coefficients of a preselected characteristic function thereby defining said first characteristic function, and means adapted to respond to said first elapsed time and said first characteristic function and corresponding set of coefficients for extrapolating said first value of said phase difference; and said second approximating means having, means adapted to respond to selected ones of said time data occurring after said selected occurrence for determining a set of coefficients of a preselected characteristic function thereby defining said second characteristic function, and means adapted to respond to said second elapsed time and said second characteristic function and corresponding set of coefficients for extrapolating said second value of said phase difference corresponding to said selected occurrence.

4. The apparatus of claim 1 or 2 wherein said first signal processing means includes:

means responsive to said signal means output signal for generating time data consisting of elapsed times between selected changes in said phase difference;

means responsive to said signal means output signal for determining an occurrence of said selected occurrence of a zero value of said first derivative;

means adapted to respond to selected ones of said time data for determining a first elapsed time between said selected occurrence and a known one of said time data occurring before said selected occurrence, and for determining a second elapsed time between said selected occurrence and a known one of said time data occurring after said selected occurrence;

said first approximating means having, curve fitting means adapted to respond to selected ones of said time data corresponding to a time interval before said selected occurrence for determining said first characteristic function, and means adapted to respond to said first elapsed time and said first characteristic function for extrapolating said first value of said phase difference; and said second approximating means having, curve fitting means adapted to respond to selected ones of said time data corresponding to a time interval occurring after said selected occurrence for determining said second characteristic function, and means adapted to respond to said second elapsed time and said second characteristic function for extrapolating said second value.

5. The apparatus of claim 1 or 2 wherein said two waves are electromagnetic waves in the form of laser beams.

6. The apparatus of claim 5 wherein said closed-loop path is in a triangular configuration.

7. The apparatus of claim 2 wherein said second signal processing means includes means for algebraically combining said sensor output signal and a signal representative of said difference value.

8. An apparatus for determining incremental lock-in error in a sensor output of an angular rate sensor of the class wherein two waves propagate in opposite directions along a closed-loop path, wherein the frequency of each of said waves is a function of the rate of rotation of said closed-loop path, said waves establishing a phase difference therebetween, wherein said sensor provides an output signal, related to the frequency difference between said waves, indicative of the rotation of said closed-loop path, but which includes lock-in error, wherein said sensor is provided with a biasing means for introducing a frequency bias in at least one of said waves for preventing said waves from locking-in to a common frequency for at least a majority of the time, the apparatus comprising:

signal means responsive to said waves for providing at least one output signal related to said phase difference between said waves;

first signal processing means responsive to said at least one output signal for providing an output signal related to incremental lock-in error due to the lock-in phenomenon of said sensor, said first signal processing means having, first approximating means for determining a first characteristic function descriptive of said phase difference for a first selected time interval in which first derivative values of said phase difference are continuously of a first polarity, said first approximating means further being capable of extrapolating from said first characteristic function a first value of said phase difference corresponding to a selected occurrence of a zero value of said first derivative having a corresponding second derivative value of said phase difference of a first polarity, and second approximating means for determining a second characteristic function descriptive of said phase difference for a second selected time interval in which first derivative values of said phase difference are continuously of a second polarity, said second approximating means further being capable of extrapolating from said second characteristic function a second value of said phase difference corresponding to said selected occurrence; and difference means for determining a difference value between said first and second values, said incremental lock-in error value being directly related to said difference value.

9. An apparatus for correcting lock-in error in a sensor output of an angular rate sensor of the class wherein two waves propagate in opposite directions along a closed-loop path, wherein the frequency of each of said waves is a function of the rate of rotation of said closed-loop path, said waves establishing a phase difference therebetween, wherein said sensor provides an output signal, related to the frequency difference between said waves, indicative of the rotation of said closed-loop path, but which includes lock-in error, wherein said sensor is provided with a biasing means for introducing a frequency bias in at least one of said waves for preventing said waves from locking-in to a common frequency for at least a majority of the time, the apparatus comprising:

signal means responsive to said waves for providing at least one output signal related to said phase difference between said waves;

first signal processing means responsive to said at least one output signal for providing an output signal related to incremental lock-in error due to the lock-in phenomenon of said sensor, said first signal processing means having, first approximating means for determining a first characteristic function descriptive of said phase difference for a first selected time interval in which first derivative values of said phase difference are continuously of a first polarity, said first approximating means further being capable of extrapolating from said first characteristic function a first value of said phase difference corresponding to a selected occurrence of a zero value of said first derivative having a corresponding second derivative value of said phase difference of a first polarity, and second approximating means for determining a second characteristic function descriptive of said phase difference for a second selected time interval in which first derivative values of said phase difference are continuously of a second polarity, said second approximating means further being capable of extrapolating from said second characteristic function a second value of said phase difference corresponding to said selected occurrence; and difference means for determining a difference value between said first and second values, said incremental lock-in error being directly related to said difference value;

second signal processing means adapted to respond to said sensor output signal and said difference value for correcting said sensor output signal value for said incremental lock-in error.

10. The apparatus of claim 8 or 9 wherein said signal processing means includes:

means responsive to said signal means output signal for generating time data consisting of elapsed times between selected changes in said phase difference;

means responsive to said signal means output signal for determining an occurrence of said selected occurrence of a zero value of said first derivative;

means adapted to respond to selected ones of said time data for determining a first elapsed time between said selected occurrence and a known one of said time data occurring before said selected occurrence, and for determining a second elapsed time between said selected occurrence and a known data time occurring after said selected occurrence;

said first approximating means having, means adapted to respond to selected ones of said time data occurring before said selected occurrence for determining a set of coefficients of a preselected characteristic function thereby defining said first characteristic function, and means adapted to respond to said first elapsed time and said first characteristic function and corresponding set of coefficients for extrapolating said first value of said phase difference; and said second approximating means having, means adapted to respond to selected ones of said time data occurring after said selected occurrence for determining a set of coefficients of a preselected characteristic function thereby defining said second characteristic function, and means adapted to respond to said second elapsed time and said second characteristic function and corresponding set of coefficients for extrapolating said second value of said phase difference corresponding to said selected occurrence.

11. The apparatus of claim 8 or 9 wherein said signal processing means includes:

means responsive to said signal means output signal for generating time data consisting of elapsed times between selected changes in said phase difference;

means responsive to said signal means output signal for determining an occurrence of said selected occurrence of a zero value of said first derivative;

means adapted to respond to selected ones of said time data for determining a first elapsed time between said selected occurrence and a known one of said time data occurring before said selected occurrence, and for determining a second elapsed time between said selected occurrence and a known one of said time data occurring after said selected occurrence;

said first approximating means having, curve fitting means adapted to respond to selected ones of said time data corresponding to a time interval before said selected occurrence for determining said first characteristic function, and means adapted to respond to said first elapsed time and said first characteristic function for extrapolating said first value of said phase difference; and said second approximating means having, curve fitting means adapted to respond to selected ones of said time data corresponding to a time interval occurring after said selected occurrence for determining said second characteristic function, and means adapted to respond to said second elapsed time and said second characteristic function for extrapolating said second value.

12. The apparatus of claim 8 or 9 wherein said two waves are electromagnetic waves in the form of laser beams.

13. The apparatus of claim 12 wherein said closed-loop path is in a triangular configuration.

14. The apparatus of claim 9 wherein said second signal processing means includes means for algebraically combining said sensor output signal and a signal representative of said difference value.

15. The apparatus of claim 8 or 9 wherein said biasing means includes means for oscillating said closed-loop path in a rotational mode back and forth.

16. The apparatus of claim 8 or 9 wherein said biasing means includes separating means positioned in the path of said waves for altering the frequency of at least one of said waves.

17. The apparatus of claim 10 wherein said preselected characteristic function is related to said frequency bias.

18. A method for obtaining incremental lock-in error values related to lock-in error in an angular rate sensor of the class wherein two waves propagate in opposite directions along a closed-loop path, wherein the frequency of each of said waves is a function of the rate of rotation of said closed-loop path, said waves establishing a phase difference therebetween, wherein said sensor provides an output signal, related to the frequency difference between said waves, indicative of the rotation of said closed-loop path, wherein said sensor is provided with a biasing means for introducing a frequency bias in at least one of said waves for preventing said waves from locking-in to a common frequency for at least a majority of the time, the method comprising the steps of:
- characterizing the behavior of said phase difference by a first characteristic function descriptive of said phase difference for a first selected time interval in which first derivative values of said phase difference are continuously of a first polarity;
- extrapolating from said first characteristic function a first value of said phase difference corresponding to a selected occurrence of a zero value of said first derivative having a corresponding second derivative value of said phase difference of a first polarity;
- characterizing said phase difference by a second characteristic function descriptive of said phase difference for a second selected time interval in which first derivative values of said phase difference are continuously of a second polarity;
- extrapolating from said second characteristic function a second value of said phase difference corresponding to said selected occurrence;
- determining the difference value between said first and second values, said incremental lock-in error value being directly related to said difference value.

19. The method of claim 18 wherein said two waves are electromagnetic waves in the form of laser beams.

20. The method of claim 18 wherein said closed-loop paths is in a triangular configuration.

21. A method for correcting the output of an angular rate sensor for incremental lock-in errors in an angular rate sensor of the class wherein two waves propagate in opposite directions along a closed-loop path, wherein the frequency of each of said waves is a function of the rate of rotation of said closed-loop path said waves establishing a phase difference therebetween, wherein said sensor provides an output signal, related to the frequency difference between said waves, indicative of the rotation of said closed-loop path, but which includes lock-in error, wherein said sensor is provided with a biasing means for introducing a frequency bias in at least one of said beams for preventing said beams from locking-in to a common frequency for at least a majority of the time, comprising:
- characterizing the behavior of said phase difference by a first characteristic function descriptive of said phase difference for a first selected time interval in which first derivative values of said phase difference are continuously of a first polarity;
- extrapolating from said first characteristic function a first value of said phase difference corresponding to a selected occurrence of a zero value of said first derivative having a corresponding second derivative value of said phase difference of a first polarity;
- characterizing said phase difference by a second characteristic function descriptive of said phase difference for a second selected time interval in which first derivative values of said phase difference are continuously of a second polarity;
- extrapolating from said second characteristic function a second value of said phase difference corresponding to said selected occurrence;
- determining an incremental lock-in error value based on the difference between said first and second values;
- algebraically combining said sensor output signal and a signal representative of said difference value for determining a corrected sensor output signal corrected for incremental lock-in error.

22. The apparatus of claim 21 wherein said two waves are electromagnetic waves in the form of laser beams.

23. The apparatus of claim 21 wherein said closed-loop path is in a triangular configuration.

24. The methods of claim 18 or 21 wherein said biasing means includes means for rotationally oscillating said closed-loop path in a rotational mode back and forth.

* * * * *